(12) United States Patent  (10) Patent No.: US 7,401,622 B2
Ungerecht  (45) Date of Patent: Jul. 22, 2008

(54) MODULAR PRESSURE REGULATOR

(75) Inventor: Cliff Ungerecht, Walla Walla, WA (US)

(73) Assignee: Nelson Irrigation Corporation, Walla Walla, WA (US)

( * ) Notice: Subject to any disclaimer, the term of this patent is extended or adjusted under 35 U.S.C. 154(b) by 221 days.

(21) Appl. No.: 11/449,751

(22) Filed: Jun. 9, 2006

(65) Prior Publication Data

US 2007/0284004 A1  Dec. 13, 2007

(51) Int. Cl.
G05D 16/08 (2006.01)
F16K 27/00 (2006.01)

(52) U.S. Cl. ............... 137/315.04; 137/315.11; 137/454.6; 137/505.25

(58) Field of Classification Search ........... 137/315.04, 137/315.11, 454.6, 505.25, 505.28
See application file for complete search history.

(56) References Cited

U.S. PATENT DOCUMENTS

| | | | |
|---|---|---|---|
| 2,788,192 A * | 4/1957 | Mountford | 137/505.22 |
| 3,251,376 A * | 5/1966 | Worden | 137/505.26 |
| 3,426,790 A | 2/1969 | Dey | |
| 3,437,109 A | 4/1969 | Carlson et al. | |
| 4,173,986 A * | 11/1979 | Martin | 137/505.25 |
| 4,314,582 A * | 2/1982 | Drori | 137/505.18 |
| 5,257,646 A | 11/1993 | Meyer | |
| 5,662,100 A | 9/1997 | Fox et al. | |
| 5,875,815 A | 3/1999 | Ungerecht et al. | |
| 5,899,221 A * | 5/1999 | Holt et al. | 137/505.25 |
| 2002/0088495 A1* | 7/2002 | Semeia | 137/505.25 |
| 2004/0221894 A1 | 11/2004 | Henley et al. | |
| 2005/0011554 A1 | 1/2005 | Davila et al. | |

* cited by examiner

Primary Examiner—Stephen M Hepperle
(74) Attorney, Agent, or Firm—Nixon & Vanderhye, PC

(57) ABSTRACT

A pressure regulator assembly comprising: a regulator body having a housing, an inlet portion at one end of the housing and a cap at an opposite end of the housing, the inlet portion and the cap in substantially coaxial alignment along a regulator body axis; a pressure regulator module received in the housing, interposed between the inlet portion and the cap, with a pressure regulator module center axis inclined at an angle to the regulator body axis; the pressure regulator module incorporating a plunger movable toward and away from a valve seat in axial alignment with the plunger; a flow path passing through the plunger and in communication with the inlet portion and the cap; and wherein the cap is removable from the regulator body housing to provide access to the pressure regulator module.

25 Claims, 3 Drawing Sheets

MODULAR PRESSURE REGULATOR

BACKGROUND OF THE INVENTION

This invention relates to fluid pressure regulators and especially those used to regulate pressure in agricultural and turf irrigation systems.

It is well-known to use fluid pressure regulators in irrigation systems in order to provide substantially constant outlet pressure over a wide range of inlet pressures. The need for such regulators is particularly acute in low-pressure systems because slight variations in pressure cause a much greater variation than the same system operating at high pressure. Pressure regulators of this type are disclosed in commonly owned U.S. Pat. Nos. 5,875,815 and 5,257,646. Briefly, the '646 patent discloses a pressure regulator where higher than desired downstream pressure will cause sufficient pressure on an internal diaphragm, attached between a fixed liner in the regulator housing and the plunger, to move the plunger toward a valve seat to thereby reduce the flow through regulator and thus reduce downstream pressure. As downstream pressure decreases, a coil spring moves the plunger away from the valve seat, thereby increasing flow through the regulator. In this way, the pressure regulator plunger constantly seeks an equilibrium position that achieves substantially constant downstream pressure.

BRIEF SUMMARY OF THE INVENTION

This invention relates to a fluid pressure regulator that has several unique characteristics that distinguish it over prior regulators. The regulator utilizes a plunger, diaphragm, and spring technology generally similar to that disclosed in the above-identified '646 patent. In accordance with an exemplary embodiment of this invention, however, the plunger and valve seat are offset from the center axis of the regulator, thus enabling location of the valve seat to one side of the flow path. This arrangement also permits a seat design that does not require supporting struts in the flow path, thereby minimizing debris hang-up within the regulator.

In addition, the offset arrangement permits automatic or manual external operation to move the seat against the plunger end to thereby shut off the regulator valve entirely. For example, if the valve seat were connected to a solenoid and pressurized from behind, the regulator could be set to automatically turn on and off as desired.

Another feature that stems from the offset plunger arrangement relates to modularizing the plunger and spring assembly, enabling these components to be removed from the unit and either repaired or changed for an assembly, one with higher or lower pressure characteristics.

Accordingly, in one aspect, the present invention relates to a pressure regulator assembly comprising: a regulator body having a housing, an inlet portion at one end of the housing and a cap at an opposite end of the housing, the inlet portion and the cap in substantially coaxial alignment along a regulator body axis; a pressure regulator module received in the housing, interposed between the inlet portion and the cap, with a pressure regulator module center axis inclined at an angle to the regulator body axis; the pressure regulator module incorporating a plunger movable toward and away from a valve seat in axial alignment with the plunger; a flow path passing through the plunger and in communication with the inlet portion and the cap; and wherein the cap is removable from the regulator body housing to permit removal and repair or replacement of the pressure regulator module.

In another aspect, the invention relates to a pressure regulator assembly comprising a regulator body having a housing, an inlet portion at one end of the housing and a cap at an opposite end of the housing, the inlet portion and the cap in substantially coaxial alignment along a regulator body axis; a pressure regulator module received in the housing, interposed between the inlet portion and the cap, with a pressure regulator module center axis inclined at an angle to the regulator body axis, the pressure regulator module including a liner provided with upper and lower chambers separated by a diaphragm extending radially between the plunger and the liner, the upper chamber in communication with the flow in the cap to thereby exert outlet or downstream force on the plunger in opposition to a spring exerting an opposite force on the plunger; and a valve seat located at one end of a valve body that is located opposite an upstream edge of the plunger.

The invention will now be described in connection with the drawings identified below.

DETAILED DESCRIPTION OF THE DRAWINGS

Figure 1:
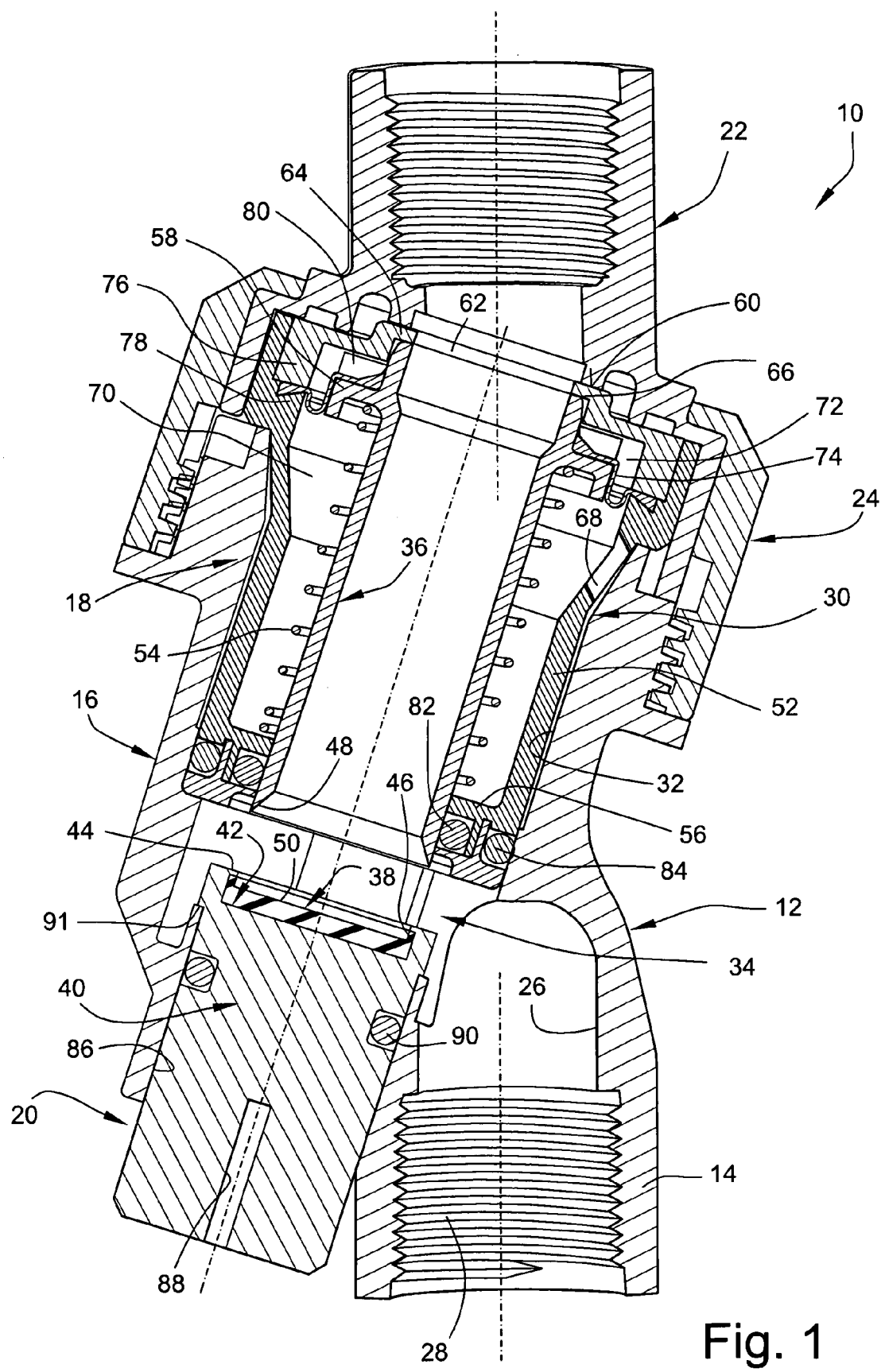
FIG. 1 is a cross section through a pressure regulator in accordance with an exemplary embodiment of the invention.

With reference to FIG. 1, a modular pressure regulator and shut-off valve assembly 10 in accordance with an exemplary embodiment of the invention includes generally a regulator body 12 formed with a threaded inlet portion 14 and an offset housing portion 16 that supports a pressure regulator module 18 and a plunger seat/shut-off valve 20. A cap 22 and the regulator module 18 are held in place by a retainer cap 24.

The flow axis of the inlet portion 14 and the cap 22 are aligned, while the axis of the regulator module 18 is offset at an angle of about 30°. This arrangement, as described in further detail below, permits easy access to both the plunger/seat shut-off valve 20 and regulator module 18 for repair and/or replacement. The arrangement also eliminates the usual practice of supporting the valve seat in the flow path via radial struts or spokes, often leading to clogging of the flow-path due to debris hang-up on the struts. Here, the flowpath from inlet portion 14 through the module 18 to the cap 22 is free of any radial supports.

More specifically, the inlet portion 14 includes a bore 26 threaded at 28 for connection to a conduit, riser or other sprinkler component. The offset housing portion is formed with a round internal cavity 30 defined by wall 32 and which receives the regulator module 18. The cavity 30 opens to the inlet bore 26 in an area 34 between the plunger/seat shut-off valve 20 and the regulator module 18. A substantially cylindrical, reciprocating plunger 36 moves toward or away from a normally fixed valve seat 38 fitted within an end of the body portion 40 of the plunger seat/shut-off valve 20, facing the plunger 36.

The valve seat 38 may be constructed of rubber or other suitable material and friction-fit within a cavity 42 formed in the body portion 40, with a peripheral lip or flange 44 holding the seat 38 in place. The radially inner edge of the flange 44 is aligned with an upstanding peripheral rib 46 on the seat 38 so that the lower edge 48 of the plunger 36 can slide past the flange 44 and engage the flat seating surface 50.

The plunger 36 is located concentrically within a liner 52 fitted within the cavity 30. A coil spring 54 is telescoped over the plunger 36 and is engaged at its lower end with a flange 56 at the lower end of liner 52 and at its upper end with a radial flange (or piston) 58 on the plunger 36. It will be appreciated that the spring 54 biases the plunger 36 in an upward direction toward a full open position vis-a-vis the valve seat 38.

A retainer liner 60, also held in place by the retainer cap 24 (and cap 22) has a center opening 62 that limits the upward movement of the plunger 36, with annular shoulder 64 engaged by the upper edge 66 of the plunger (when in the fully open position). At the opposite end of the liner 52, the plunger 36 is guided by the flange 56.

A radial space or spring chamber 70 between the plunger 36 and liner 52 below the flange or piston 58 is separated from a pressure chamber 72 above the flange or piston 58 by an annular, rolling-type diaphragm 74. The radially outer edge of the diaphragm 74 is sandwiched between skirt 76 of retainer liner 60 and shoulder 78 formed in the liner 52. The radially inner edge of the diaphragm is sandwiched between a diaphragm retainer 80 and the piston or flange 58. Note that retainer liner 60 may be press/interference fit within the liner 52 or otherwise suitably secured during assembly, and that the underside of the cap engages the diaphragm retainer 80 such that diaphragm 74 is fixed in place.

O-ring seals 82, 84 prevent fluid from entering spaces between the liner 52 and housing portion 16, and between the plunger 36 and liner 52. The pressure chamber 72 above the piston or flange 58 is open to downstream pressure by suitably located spring chamber vents 68 that permit fluid pressure to be exerted on the flange or piston 58.

The operation of the pressure regulator per se is known. Depending on the selected spring constant for spring 54, higher than desired downstream pressure will cause sufficient pressure on the diaphragm 74 and flange 58 to move the plunger toward the valve seat and thereby reduce flow through area 34 and thus reduce the downstream pressure. As downstream pressure decreases, the plunger 36 will move in the opposite direction to increase flow. As will be appreciated, the plunger continuously seeks an equalization point determined by the strength of spring 54 and flow through the regulator so as to produce substantially constant downstream pressure. Under extreme upstream pressure conditions, the plunger 36 will engage the seat 38 to greatly restrict flow through the regulator.

In this invention, additional features are enabled by the offset arrangement of the pressure regulator and seat. For example, the offset arrangement facilitates manufacture of a modular regulator module. In this case, upon removal of the threaded retainer cap 24, the otherwise captured cap 22 can be removed, thereby providing direct access to the regulator module 18 which includes the liner 52, plunger 36, spring 54 and retainer liner 60. Thus, if the properties or performance characteristics of the regulator need to be altered, the user can simply substitute one pressure regulator module 18 for another. Seat body 40 is now also easily accessible to the user via removal of the regulator module 18.

In addition, the plunger seat/shut-off valve 20 can be moved manually by any suitable arrangement into engagement with the edge 48 of the plunger 36 to shut off all flow through the regulator. For example, the body 40 may be friction-fit within the offset bore 86 so that for movement toward and away from the plunger with the aid of a tool engaging slot 88. An O-ring seal 90 prevents escape of fluid through the bore 86. A flange or lip 91 prevents the body 40 from being removed from the rear, but the body can be removed from within upon removal of the module 18.

Figure 2:
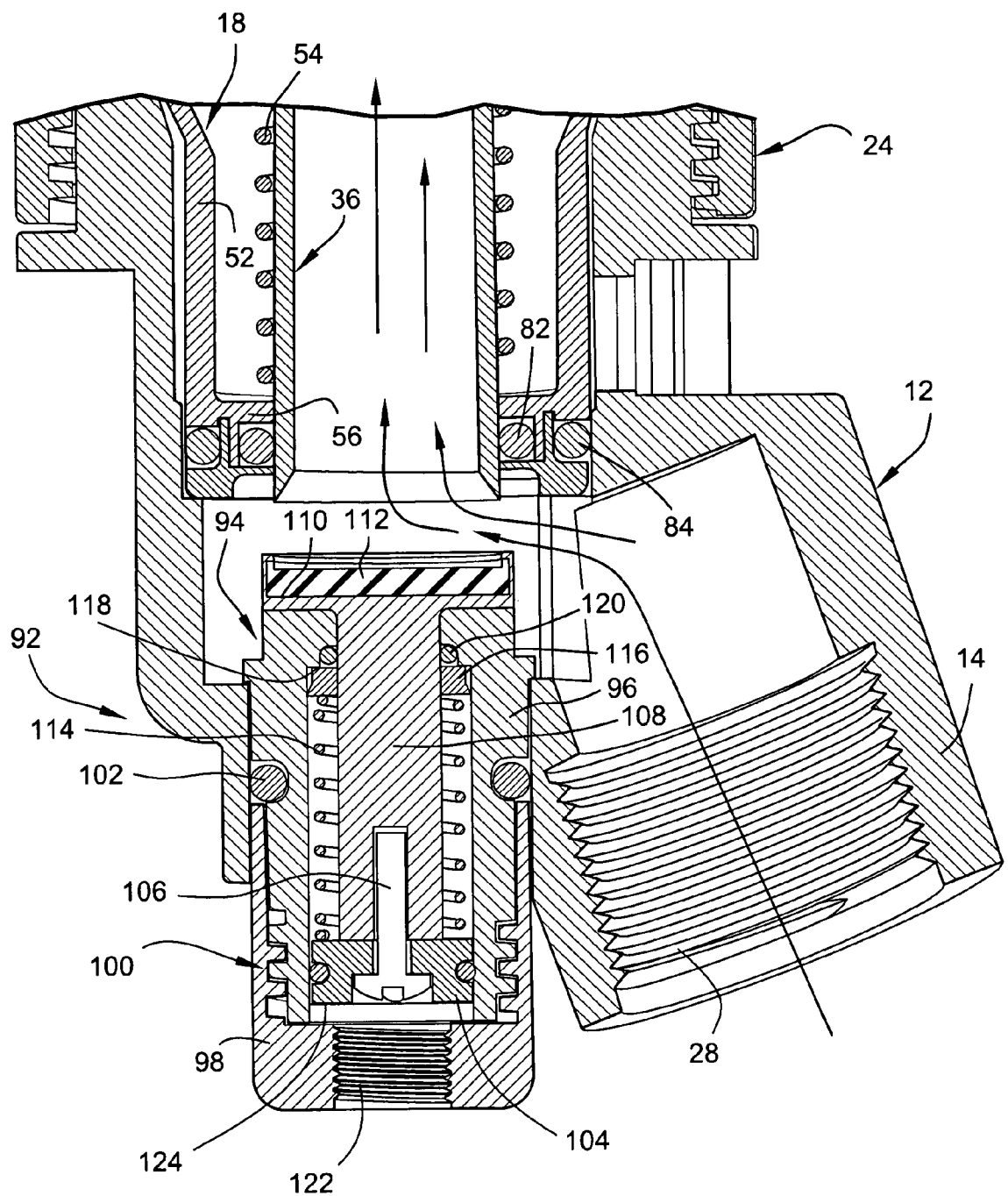
FIG. 2 is a cross section through a pressure regulator in accordance with another embodiment of the invention.
Figure 3:
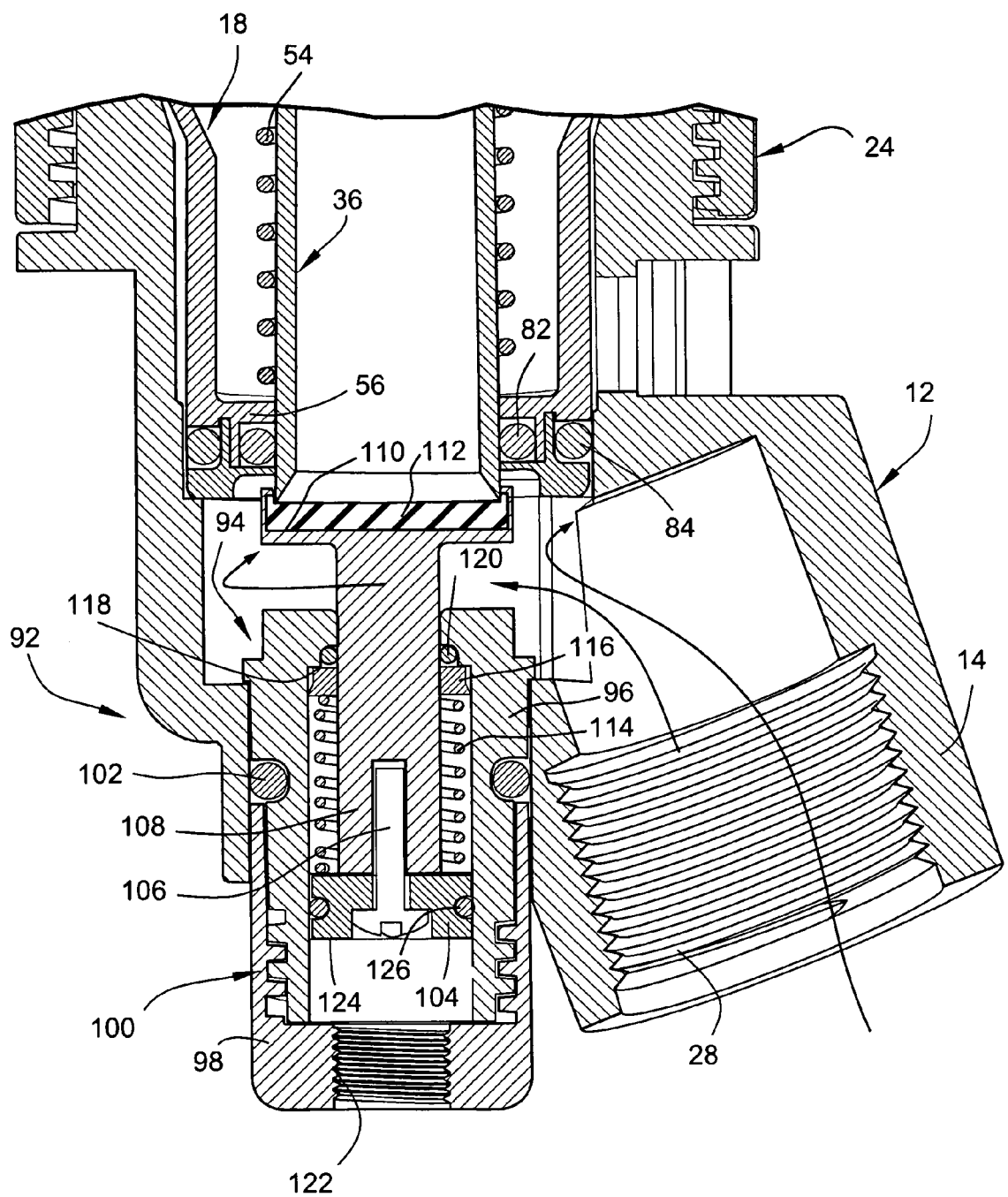
FIG. 3 is a cross section similar to FIG. 2 but with the valve seat engaged with the plunger in a regulator shut-off position.

FIGS. 2 and 3 illustrate another embodiment of a regulator plunger seat/shut-off valve assembly 92. Movement of the seat body 94 of the plunger seat/shut-off valve 92 in this embodiment is controlled remotely in response to established operating cycles and/or performance events. The pressure regulator module 18 is substantially identical in structure and operation to that described above and need not be repeated here. The plunger seat/shut-off valve 92, however, is modified to allow for remote operation. Specifically, the seat body 94 includes a pair of telescoped liners 96, 98 threaded together at 100, with an O-ring seal 102 at the interface. The inner liner 96 also serves as a cylinder for a piston assembly that slides within the cylinder. The piston assembly includes piston 104 secured by screw fastener 106 (or other suitable means), to a rod 108, the free end of which is formed to include the valve seat cavity 110. A rubber seat 112 is captured within the cavity in the same manner as described above in connection with FIG. 1. A coil spring 114 is engaged between the piston 104 and a piston ring 116 seated on an internal shoulder 118 formed in the inner liner 96. The spring 114 biases the rod 108 and hence the seat 112 to an open position as shown in FIG. 2. An O-ring 120 prevents escape of fluid along the piston rod.

A port 122 in the liner 98 provides an inlet for high-pressure air or water to be directed against the piston 104 to move the rubber seat 112 to a shut-off position as shown in FIG. 3, with seat 112 engaged with the plunger 36. An O-ring 126 prevents the high-pressure actuator fluid from penetrating past the piston 104. With this arrangement, remote operation of the plunger seat/shut-off valve 92 may be effected based on various system criteria. Note that easy access to the interior of the plunger seat/shut-off valve 92 is provided simply by unscrewing the liner 98. With liner 98 removed, the piston 104 can be removed via screw 106, thereby permitting replacement of the spring 114, if needed or desired.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A pressure regulator assembly comprising:
   a regulator body having a housing, an inlet portion at one end of said housing and a cap at an opposite end of said housing, said inlet portion and said cap in substantially coaxial alignment along a regulator body axis;
   an interchangeable pressure regulator module received in said housing, interposed between said inlet portion and said cap, with a pressure regulator module center axis inclined at an angle to said regulator body axis;
   said pressure regulator module incorporating a plunger movable toward and away from a valve seat in axial alignment with said plunger;
   a flow path passing through said plunger and in communication with said inlet portion and the cap; and
   wherein the cap is removable from said regulator body housing to permit removal and repair or replacement of said pressure regulator module.

2. The pressure regulator assembly of claim 1 wherein said valve seat is located at one end of a valve body that is located opposite an upstream edge of said plunger.

3. The pressure regulator assembly of claim 2 wherein an opposite end of said valve body projects out of said housing.

4. The pressure regulator assembly of claim 3 wherein said opposite end of said valve body is provided with a finger grip enabling said valve seat to be moved into engagement with said plunger to thereby shut off the regulator.

5. The pressure regulator assembly of claim 4 wherein said valve body is threadably received in said housing and said finger grip enables a user to rotate said valve body to move said valve seat toward or away from said plunger.

6. The pressure regulator assembly of claim 1 wherein said cap is held in engagement with said housing by a retainer cap threaded onto said housing.

7. The pressure regulator assembly of claim 2 wherein said valve body includes a piston, said piston slidable within a cylinder; said cylinder adapted to receive fluid under pressure to drive said valve seat against said plunger.

8. The pressure regulator assembly of claim 1 wherein said plunger is resiliently biased away from said valve seat.

9. The pressure regulator assembly of claim 1 wherein said pressure regulator module also includes a liner provided with upper and lower chambers separated by a diaphragm extending radially between said plunger and said liner, and a spring biasing said plunger in a downstream direction.

10. The pressure regulator assembly of claim 9 wherein said upper chamber is in communication with the flow in said cap to thereby exert outlet or downstream pressure on said plunger in opposition to said spring.

11. The pressure regulator assembly of claim 9 wherein said valve seat is located at one end of a valve body that is located opposite an upstream edge of said plunger; and
wherein said valve body is moveable into engagement with a lower edge of said plunger to thereby shut off all flow through said regulator body.

12. The pressure regulator assembly of claim 11 wherein said valve body comprises a piston, said piston slidable within a cylinder; said cylinder adapted to receive fluid under pressure to drive said valve seat against said plunger.

13. The pressure regulator assembly of claim 1 wherein said flowpath is free of any radial supports or struts.

14. A pressure regulator assembly comprising a regulator body having a housing, an inlet portion at one end of said housing and a cap at an opposite end of said housing, said inlet portion and said cap in substantially coaxial alignment along a regulator body axis;
a pressure regulator module received in said housing, interposed between said inlet portion and said cap, with a pressure regulator module center axis inclined at an angle to said regulator body axis, said pressure regulator module incorporating a plunger moveable toward and away from a valve seat, a liner provided with upper and lower chambers separated by a diaphragm extending radially between said plunger and said liner, and a spring bearing said plunger in a downstream direction; and
a valve seat located at one end of a valve body that is located opposite an upstream edge of said plunger.

15. The pressure regulator assembly of claim 14 wherein an opposite end of said valve body projects out of said housing.

16. The pressure regulator assembly of claim 14 wherein said opposite end of said valve body is provided with a finger grip enabling said valve seat to be moved into engagement with said plunger to thereby shut off the regulator.

17. The pressure regulator assembly of claim 14 wherein said valve body comprises a piston, said piston slidable within a cylinder; said cylinder adapted to receive fluid under pressure to drive said valve seat against said plunger.

18. The pressure regulator assembly of claim 14 wherein said valve body is moveable into engagement with a lower edge of said plunger to thereby shut off all flow through said regulator body.

19. The pressure regulator assembly of claim 14 wherein said upper chamber is in communication with the flow in said cap to thereby exert outlet or downstream pressure on said plunger in opposition to said spring.

20. A pressure regulator assembly comprising:
a regulator body having a housing, an inlet portion at one end of said housing and a cap at an opposite end of said housing, said inlet portion and said cap in substantially coaxial alignment along a regulator body axis;
an interchangeable pressure regulator module received in said housing, interposed between said inlet portion and said cap, with a pressure regulator module center axis inclined at an angle to said regulator body axis;
said pressure regulator module incorporating a plunger movable toward and away from a valve seat in axial alignment with said plunger;
a flow path passing through said plunger and in communication with said inlet portion and the cap;
wherein said valve seat is located at one end of a valve seat body that is located opposite an upstream edge of said plunger; and
wherein said valve seat body is moveable such that said valve seat is caused to move into engagement with a lower edge of said plunger to thereby shut off all flow through said regulator body.

21. The assembly of claim 20 wherein the valve seat body is movable manually to cause said valve seat to engage said lower edge of said plunger.

22. The assembly of claim 20 wherein the valve seat body is movable automatically by fluid means to cause said valve seat to engage said lower edge of said plunger.

23. The assembly of claim 22 wherein said fluid means includes a piston assembly, with the valve seat attached to one end of a piston rod.

24. The assembly of claim 23 wherein said valve seat body is comprised of a pair of telescoped liners, said inner liner serving as a cylinder for said piston assembly.

25. The assembly of claim 20 wherein said flowpath is free of any radial supports or struts.

\* \* \* \* \*